United States Patent
Pfortner et al.

(10) Patent No.: US 9,831,660 B2
(45) Date of Patent: Nov. 28, 2017

(54) DEVICE FOR PROTECTING A COMPONENT AGAINST THERMAL OVERLOAD

(71) Applicant: PHOENIX CONTACT GMBH & CO. KG, Blomberg (DE)

(72) Inventors: Steffen Pfortner, Springe (DE); Thomas Meyer, Ottenstein (DE)

(73) Assignee: PHOENIX CONTACT GMBH & CO. KG (DE)

( * ) Notice: Subject to any disclaimer, the term of this patent is extended or adjusted under 35 U.S.C. 154(b) by 360 days.

(21) Appl. No.: 14/416,115

(22) PCT Filed: Jul. 15, 2013

(86) PCT No.: PCT/EP2013/064915
§ 371 (c)(1),
(2) Date: Jan. 21, 2015

(87) PCT Pub. No.: WO2014/016156
PCT Pub. Date: Jan. 30, 2014

(65) Prior Publication Data
US 2015/0180223 A1    Jun. 25, 2015

(30) Foreign Application Priority Data

Jul. 24, 2012 (DE) .................. 10 2012 014 595

(51) Int. Cl.
*H02H 5/04* (2006.01)
*H01C 7/12* (2006.01)
(Continued)

(52) U.S. Cl.
CPC ............... *H02H 5/047* (2013.01); *H01C 7/12* (2013.01); *H01H 37/76* (2013.01); *H01T 1/14* (2013.01)

(58) Field of Classification Search
CPC .......... H02H 5/047; H01C 7/12; H01H 37/76; H01T 1/14
See application file for complete search history.

(56) References Cited

U.S. PATENT DOCUMENTS 4,763,365 A * 8/1988 Gerondale ............. H02H 3/334
                                                       324/509
9,083,174 B2 * 7/2015 Meyer .................. H01H 37/767

FOREIGN PATENT DOCUMENTS

WO    WO 2008/028724 A1    3/2008
WO    WO 2012/017089 A1    2/2012

OTHER PUBLICATIONS

International Search Report prepared by the European Patent Office dated Nov. 19, 2013, for International Application No. PCT/EP2013/064915.

* cited by examiner

*Primary Examiner* — Zeev V Kitov
(74) *Attorney, Agent, or Firm* — Sheridan Ross P.C.

(57) ABSTRACT

The object of the invention is a device (1) for protecting a component (EB) against thermal overload. The device (1) has an actuating mechanism (B) which is brought into thermal contact with the component to be protected (EB) when in use, and which is capable of activating a switch (S) upon reaching a certain temperature $T_{switch}$. The switch (S) can be used both as a disconnection switch and as a short-circuiting switch in relation to the component to be protected (EB), with the switch (S) furthermore having a selection mechanism (A) with which one can choose whether the switch (S) should be used as a disconnection switch or as a short-circuiting switch in relation to the component to be protected (EB).

20 Claims, 4 Drawing Sheets

(51) Int. Cl.
*H01H 37/76* (2006.01)
*H01T 1/14* (2006.01)

DEVICE FOR PROTECTING A COMPONENT AGAINST THERMAL OVERLOAD

CROSS-REFERENCE TO RELATED APPLICATIONS

This application is a national stage application under 35 U.S.C. 371 and claims the benefit of PCT Application No. PCT/EP2013/064915 having an international filing date of Jul. 15, 2013, which designated the United States, which PCT application claimed the benefit of German Patent Application No. 102012014595.0 filed Jul. 24, 2012, the disclosure of each of which are incorporated herein by reference in their entirety.

The invention concerns a device for protecting a component against thermal overload.

In many domains, an electrical component can be overloaded due to a wide variety of causes. Such causes can be related to the aging process, but they can also be outside influences such as a faulty connection or excess voltage. As a rule, this excess voltage means that a component is being operated outside its actual nominal operating range. This is often accompanied by intense heating, which can exert lasting damage on the component itself or endanger the surroundings with smoke gases or fire.

For example, components such as surge-protection elements have a certain insulation strength. But if the components are damaged by excess voltage, it leads to a decrease in insulation strength and ongoing power conversion at the damaged element, which needs to be dissipated as heat.

In order to control such a power conversion, disconnection devices are proposed such as those known from DE 42 41 311 A1, DE 699 04 274 or U.S. Pat. No. 6,430,019. Alternatively, the components are protecting by being short-circuited.

Both kinds of protection device essentially involve the same basic principle. A solder connection maintains a switching device in a force-applied state. The solder site is placed in thermal connection with the component to be protected. Now, if the temperature at the solder site exceeds the softening temperature, the switch is activated under the action of the applied force, thereby protecting the component.

Even though these mechanisms known from the prior art offer functional solutions, the production expense and engineering cost involved in their technical implementation are high due to the diverse nature of the solutions.

Therefore, the problem of the invention is to offer a universal solution which can be used optionally as a disconnection or as a short-circuiting switch for a component to be protected.

The solution of the problem is accomplished according to the invention by the features of the independent claims. Advantageous embodiments of the invention are given in the subclaims.

The invention will be explained in greater detail below, with reference to the enclosed drawing, by means of preferred embodiments.

Figure 1:
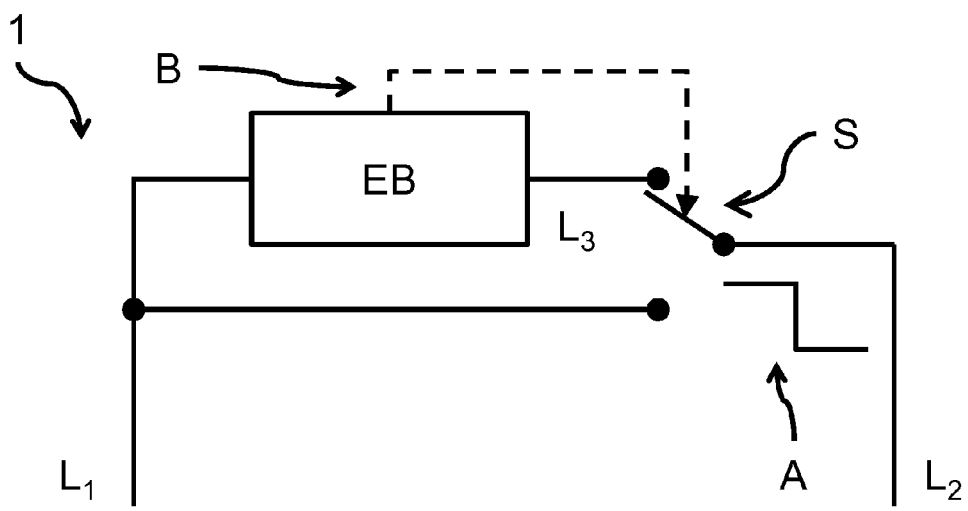
Figure 2:
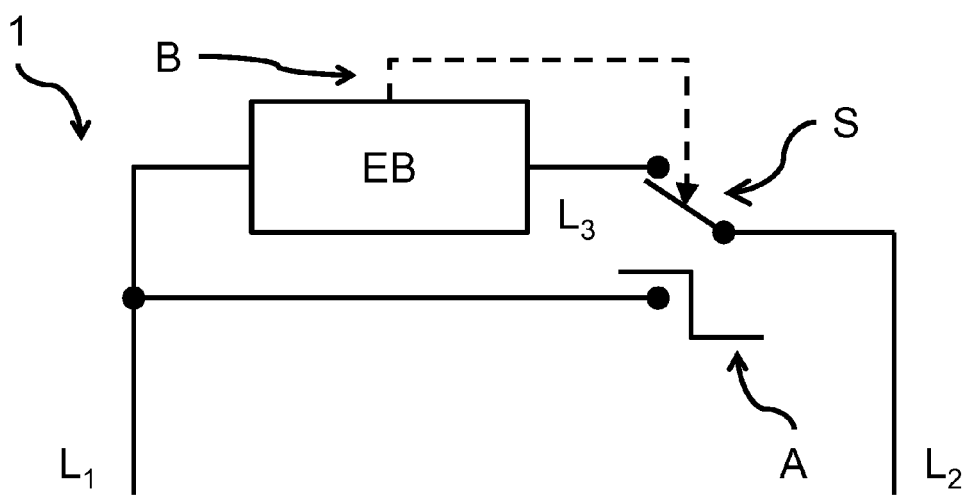
Figure 3:
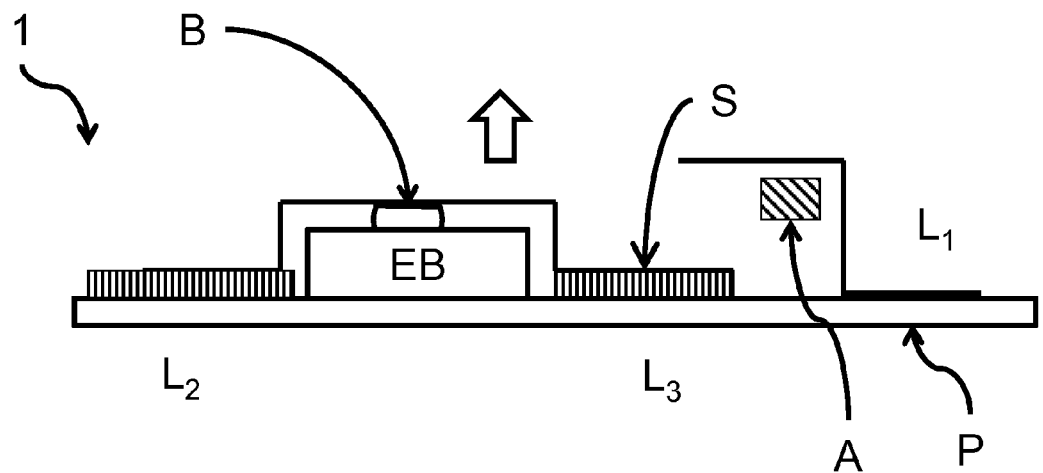
Figure 4:
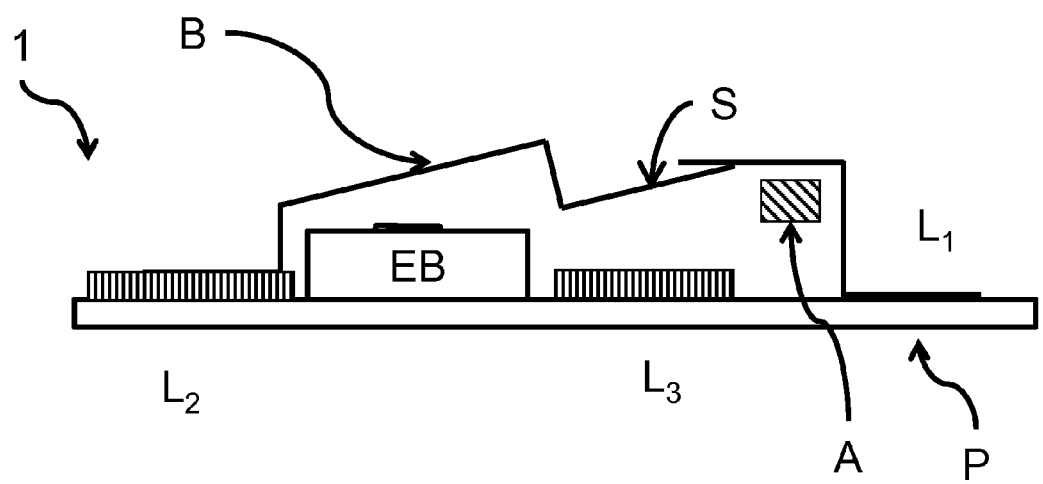
Figure 5:
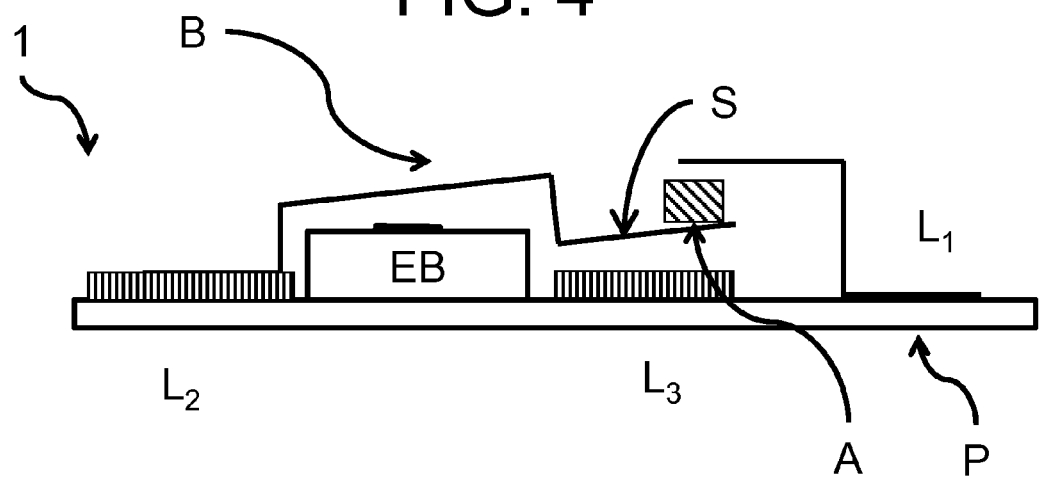
Figure 6:
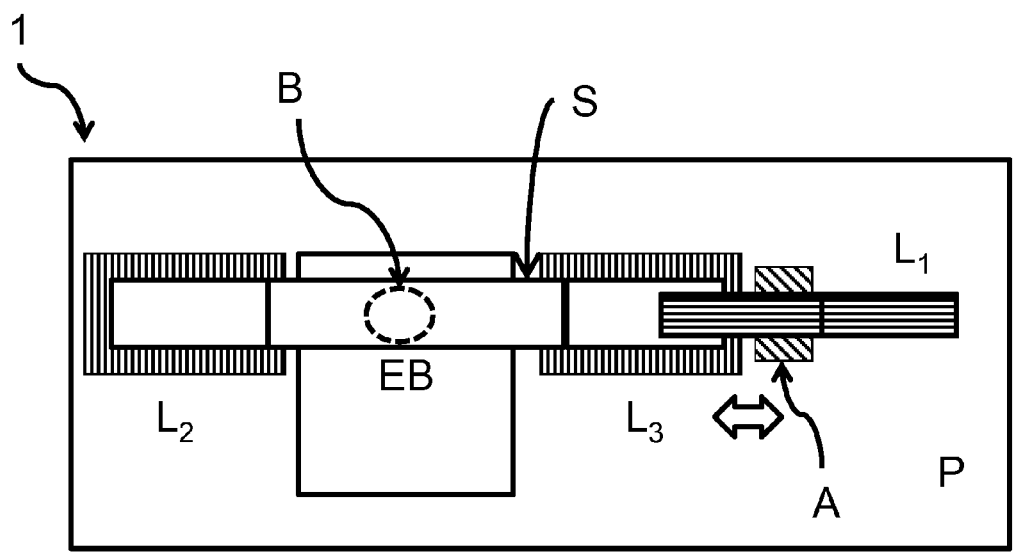
Figure 7:
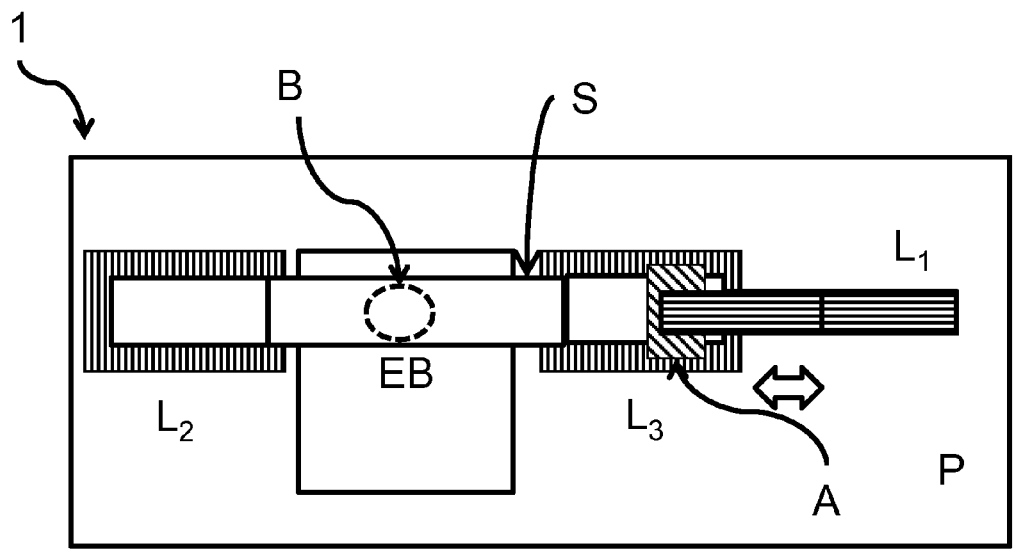
Figure 8:
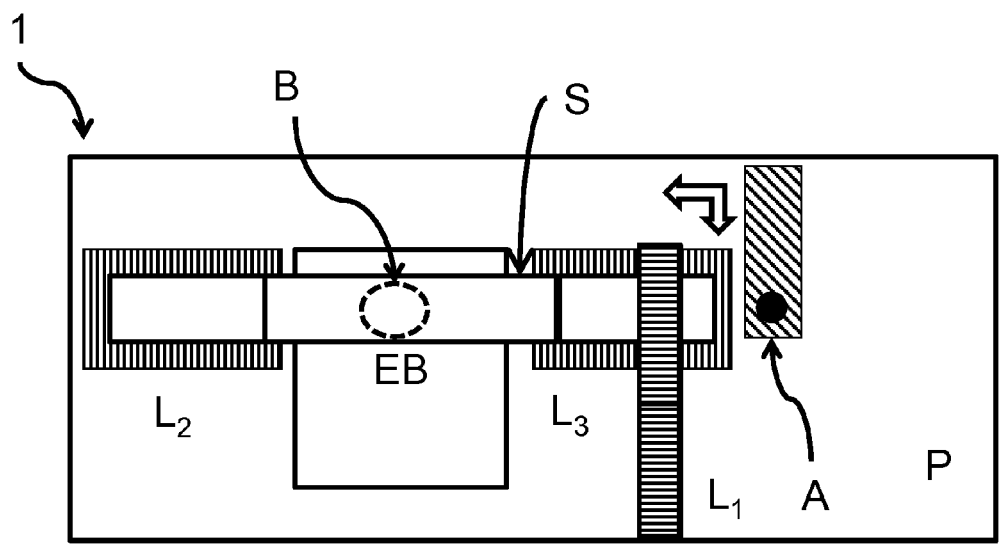
Figure 9:
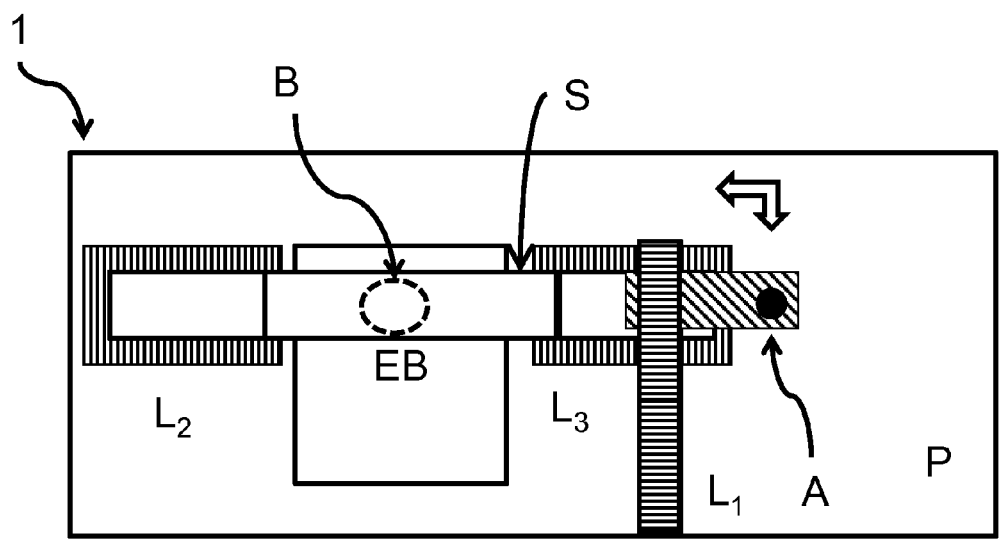

There are shown:

FIG. 1: a schematic representation of a device for protecting a component against thermal overload according to one embodiment of the invention in a first selected position, FIG. 2: a schematic representation of a device for protecting a component against thermal overload according to one embodiment of the invention in a second selected position, FIG. 3: a schematic representation in side view of a device for protecting a component against thermal overload according to one embodiment of the invention in a first selected position in the nonswitched state, FIG. 4: a schematic representation in side view of a device for protecting a component against thermal overload according to one embodiment of the invention in a first selected position in the switched state, FIG. 5: a schematic representation in side view of a device for protecting a component against thermal overload according to one embodiment of the invention in a second selected position in the switched state, FIG. 6: a schematic representation in top view of a device for protecting a component against thermal overload according to one embodiment of the invention in a first selected position, FIG. 7: a schematic representation in top view of a device for protecting a component against thermal overload according to one embodiment of the invention in a second selected position, FIG. 8: a schematic representation in top view of a device for protecting a component against thermal overload according to another embodiment of the invention in a first selected position, and FIG. 9: a schematic representation in top view of a device for protecting a component against thermal overload according to another embodiment of the invention in a second selected position.

FIG. 1 shows a schematic representation of a device 1 for protecting a component EB against thermal overload according to one embodiment of the invention in a first selected position.

The device 1 for protecting a component EB against thermal overload has an actuating mechanism B, which is brought into thermal contact with the component EB to be protected when in use, and which is capable of activating a switch S upon reaching a particular temperature $T_{switch}$.

For example, the actuating mechanism is designed as a thermally detachable connection between the component EB to be protected and a pre-tensioned element, such as the switch S. For example, this can be realized by a suitable solder or a suitable adhesive. If the solder or the adhesive is softened, the force of a pre-tensioned element is released and the switch S switches to a different state.

The switch S can be used both as a disconnection switch and as a short-circuiting switch in relation to the component EB to be protected, with the switch S furthermore having a selection mechanism A with which one can select whether the switch S should be used as a disconnection switch or as a short-circuiting switch in relation to the component EB to be protected.

This function of the selection element A will now be explained in greater detail by means of FIG. 1 and FIG. 2. FIG. 2 in turn shows a schematic representation of a device 1 for protecting a component EB against thermal overload in a second selected position.

In the first selected position according to FIG. 1, the selection element A is set such that the switch S works as a short-circuiting switch in relation to the component EB to be protected, i.e., supply line $L_1$ is connected directly to supply line $L_2$ and the component to be protected is thus bypassed. In the nonswitched state, as shown in FIG. 1, the switch is set so that the supply line $L_1$ is connected to the supply line $L_3$ of the component EB to be protected.

Although reference is made above and hereafter to specific supply lines and specific functions, it is understood by the skilled person that this description is merely an example of a plurality of variations in regard to the actual circuit.

Now, if the selection element A is moved into the switching path as shown in FIG. 2, a short-circuit will no longer be effected upon switching of the switch S, but instead the conductor $L_1$ and the conductor $L_2$ will no longer be connected, i.e., the component EB to be protected is now disconnected.

In FIGS. 3 to 5, this is again [illustrated] in side-view schematic representations of a device for protecting a component against thermal overload according to one embodiment of the invention in a first selected position in the nonswitched state, in a first selected position in the switched state, and in a second selected position in the switched state.

The device 1 here is shown mounted on a circuit board P. A stirrup-shaped structure B which is electrically connected to the first supply line $L_2$ is located on top of the component EB to be protected. The structure B is in thermal connection with the component EB to be protected by means of a solder or an adhesive. The structure is under stress, which is oriented so that the structure is detached at least on one side upon reaching the switching temperature. FIG. 3 shows the non-detached position. Here, the structure B is held by the solder/adhesive. Depending on the position of the selection element A, in the switched state there can now result either a short circuit with supply line $L_1$, as shown in FIG. 4, or a detachment of the structure B from the contact $L_3$, as shown in FIG. 5, but with a switch to the supply line $L_1$ and thus a short circuit being prevented and with only a disconnection being provided.

Preferably, the actuating mechanism B has a spring construction or has a spring. In this way, a favorable force accumulator can be realized.

Furthermore, the selection mechanism A preferably has an insulating element, which can prevent the switch S from short-circuiting the component EB to be protected. The insulating element can be made from conventional materials, particularly circuit board materials.

In certain embodiments it can be provided that the selection is only possible during the actual installation of the component EB to be protected. This prevents faulty switching for certain components or specific devices being protected and instead only enables the exact selection by the manufacturer, i.e., the selection by means of the selection mechanism A can only be chosen during the installation of the device 1 with a component EB to be protected.

In other embodiments, this can be chosen freely, e.g., after installation, according to the particular purpose.

The selection mechanism can have different configurations, and the following remarks are exemplary and not exclusive.

For example, the selection mechanism A can choose by means of a sliding movement of an insulation element ISO whether the switch S should be used as a disconnection switch or as a short-circuiting switch in regard to the component EB to be protected. One such embodiment is shown in FIGS. 6 and 7 in top-view schematic representations of a device for protecting a component against thermal overload according to one embodiment of the invention in a first selected position and a second selected position.

For example, the selection mechanism A can choose by means of a rotary movement of an insulation element ISO whether the switch S should be used as a disconnection switch or as a short-circuiting switch in regard to the component EB to be protected. One such embodiment is shown in FIGS. 8 and 9 in top-view schematic representations of a device for protecting a component against thermal overload according to one embodiment of the invention in a first selected position and a second selected position.

The two forms of movement can also be combined or augmented with further forms of movement.

In one embodiment of the invention, the component (EB) to be protected is a semiconductor component, especially a varistor or a transient-voltage suppressor diode.

With the help of the invention, it is now possible for a single device to combine both safeguarding purposes, namely, the disconnecting and the short-circuiting ones, in a single low-cost design.

LIST OF REFERENCE SYMBOLS

1 Device for protecting against thermal overload
EB Component to be protected
B Actuating mechanism
$T_{switch}$ Switching temperature
S Switch
A Selection mechanism
P Circuit board
$L_1$, $L_2$, $L_3$ Supply line

The invention claimed is:

1. A device for protecting a component against thermal overload, comprising:
   an actuating mechanism, which is brought into thermal contact with the component to be protected when in use, and which upon reaching a particular temperature is capable of activating a switch, wherein the switch is configured for use both as a disconnecting switch that isolates the component to be protected from power supply lines and as a short-circuiting switch that short circuits the power supply lines to bypass the component to be protected, with the switch furthermore having a selection mechanism with which one can choose whether the switch should be used as the disconnecting switch or as the short-circuiting switch,
   wherein the power supply lines, the actuating mechanism, the switch, and the selection mechanism are mounted on a circuit board, and
   wherein the selection by means of the selection mechanism is only possible during installation of the device with a component to be protected.

2. The device according to claim 1, wherein the actuating mechanism has a spring.

3. The device according to claim 1, wherein the selection mechanism has an insulating element, which prevents the switch from short-circuiting the component to be protected.

4. The device according to claim 1, wherein the selection mechanism chooses by means of a sliding and/or rotary movement of an insulation element whether the switch should be used as the disconnecting switch or as the short-circuiting switch.

5. The device according to claim 1, wherein the component to be protected is a semiconductor component comprising at least one of a varistor and a transient-voltage suppressor diode.

6. A device for protecting a component against thermal overload, comprising:
   an actuating mechanism, which is brought into thermal contact with the component to be protected when in use, and which upon reaching a particular temperature is capable of activating a switch, wherein the switch is configured for use both as a disconnecting switch that isolates the component to be protected from power supply lines and as a short-circuiting switch that short circuits the power supply lines to bypass the component to be protected, with the switch furthermore having a selection mechanism with which one can choose whether the switch should be used as the disconnecting switch or as the short-circuiting switch, wherein the device is mounted on a circuit board, wherein the actuating mechanism has a spring, wherein the selection mechanism has an insulating element, which prevents the switch from short-circuiting the component to be protected, wherein the selection mechanism chooses by means of a sliding and/or rotary movement of an insulation element whether the switch should be used as the disconnecting switch or as the short-circuiting switch in regard to the component to be protected, wherein the selection by means of the selection mechanism is only possible during the actual installation of the device with the component to be protected, and wherein the component to be protected is a semiconductor component, selected from one or more of a varistor and a transient-voltage suppressor diode.

7. A device for protecting a component against thermal overload, comprising:

an actuating mechanism, which is brought into thermal contact with the component to be protected when in use, and which upon reaching a particular temperature is capable of activating a switch, wherein the switch is configured for use both as a disconnecting switch and as a short-circuiting switch in relation to the component to be protected, with the switch furthermore having a selection mechanism with which one can choose whether the switch should be used as the disconnecting switch or as the short-circuiting switch, wherein the disconnecting switch isolates the component to be protected from a first power supply line, a second power supply line and a third power supply line, wherein the short-circuiting switch short circuits the second power supply line and the third power supply line to bypass the component to be protected, and wherein the actuating mechanism includes a stirrup shaped structure that is connectable between first and second power supply lines of the component to be protected.

8. The device according to claim 7, wherein the first, second, and third power supply lines and the component to be protected are mounted on a circuit board, and wherein the component to be protected is mounted between the first and second power supply lines on the circuit board.

9. The device according to claim 8, wherein a first end of the stirrup shaped structure includes a tension structure connected to the first power supply line, and a middle section of the stirrup shaped structure is adhered to the component to be protected by a temperature sensitive adhesive such that the tension structure is set with a desired amount of tension.

10. The device according to claim 9, wherein the temperature sensitive adhesive includes solder.

11. The device according to claim 9, wherein the tension structure is a spring.

12. The device according to claim 9, wherein a second end of the stirrup shaped structure is movable from the second power supply line to the third power supply line upon release of the tension such that the second end serves as the switch.

13. The device according to claim 12, wherein the selection mechanism is an insulating element movable between a first position that blocks the second end from contacting the third power supply line upon release of the tension and a second position that allows the second end to contact the third power supply line upon release of the tension.

14. The device according to claim 12, wherein the middle section is longer than the component to be protected in a plane that extends from the first end to the second end.

15. The device according to claim 1, wherein the power supply lines include first, second, and third power supply lines, wherein the first, second, and third power supply lines and the component to be protected are on a circuit board, and wherein the component to be protected is between the first and second power supply lines on the circuit board.

16. The device according to claim 15, wherein the actuating mechanism includes a stirrup shaped structure that is connectable between the first and second power supply lines of the component to be protected, wherein a first end of the stirrup shaped structure includes a tension structure connected to the first power supply line, and wherein a middle section of the stirrup shaped structure is adhered to the component to be protected by a temperature sensitive adhesive such that the tension structure is set with a desired amount of tension.

17. The device according to claim 16, wherein the temperature sensitive adhesive includes solder.

18. The device according to claim 16, wherein the tension structure is a spring.

19. The device according to claim 16, wherein a second end of the stirrup shaped structure is movable from the second power supply line to a third power supply line upon release of the tension such that the second end serves as the switch.

20. The device according to claim 19, wherein the selection mechanism is an insulating element movable between a first position that blocks the second end from contacting the third power supply line upon release of the tension and a second position that allows the second end to contact the third power supply line upon release of the tension.

* * * * *